United States Patent Office 3,449,393
Patented June 10, 1969

3,449,393
PREPARATION OF METHYL-(BROMOMETHYL)-CHLOROSILANES
Hans Sattlegger, Cologne-Buchheim, Walter Simmler, Odenthal-Schlinghofen, Walter Noll, Opladen, and Hans Niederprum, Monheim, Germany, assignors to Farbenfabriken Bayer Aktiengesellschaft, Leverkusen, Germany, a corporation of Germany
No Drawing. Filed Oct. 26, 1966, Ser. No. 589,496
Claims priority, application Germany, Nov. 20, 1965, F 47,723
Int. Cl. C07f 7/02, 7/10
U.S. Cl. 260—448.2      5 Claims This invention relates to methyl-(bromomethyl)-chlorosilanes, and is especially concerned with a process for their preparation by the monobromination of dimethyl-dichlorosilane or trimethylchlorosilane.

A single process has hitherto been disclosed for the preparation of these compounds in which a mixture of chlorine and bromine is employed under the catalytic action of light. More detailed research, however, has shown that this process has substantial disadvantages. For instance, in addition to the desired monobrominated methyl-chlorosilanes, there are obtained substantial quantities of chlorinated and higher halogenated methyl-chlorosilanes. In a continuous process, for example, these may amount to up to 15 percent by weight of chlorinated products and up to 30 percent by weight of higher halogenated products. There occur, moreover, in a continuous process repeated so-called cold flames and explosions when excess chlorination takes place at any point of the reaction apparatus, due to the uneven distribution of the chlorine. The presence of the higher halogenated products in the mixture results in considerable losses in yield, especially because they catalyse the decomposition of the bromomethyl compounds when the latter are separated by the here necessary and expensive distillative isolation.

We have now found a bromination process which avoids these disadvantages, and according to the invention a process for the preparation of a methyl-(bromomethyl)-chlorosilane of the formula

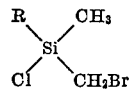

wherein R represents a methyl radical or a chlorine atom, comprises reacting a methyl-chlorosilane of the formula

with sulphuryl chloride and bromine at a temperature between 20 and 80° C., optionally in the presence of an organic free radical initiator. Azo-iso-butyrodinitrile has proved to be most suitable as the radical initiator.

The process of the invention can be carried out by heating a stoichiometric mixture of the reaction components, advantageously after the addition of a catalytic amount of azo-iso-butyrodinitrile, for example 1 gram for every mol of the silicon compound, until the reaction is complete, or by working in a continuous manner by continuously feeding the mixture into a heated reaction vessel provided with an overflow, and separating the overflowing product from unreacted reaction components at 60 to 130° C. in a distillation vessel, the unreacted reactants being recycled. This reaction proceeds according to the equation:

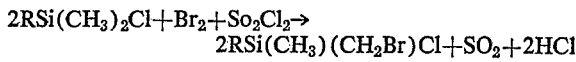

A reaction of this kind was not to be expected in view of previous experience. Admittedly, it is known to chlorinate methyl-chlorosilanes by means of sulphuryl chloride in the presence of a free radical initiator, such as benzoyl peroxide or azo-iso-butyrodinitrile. However, an analogous bromination with the intermediate formation of sulphuryl bromide could on no account be expected, since firstly it is known that sulphuryl chloride does not exchange its halogen either with bromine or with hydrogen bromide, but oxidises the latter to bromine, and secondly it has not hitherto been possible to prepare sulphuryl bromide, its very existence being in doubt (cf. Zeitschrift für anorganische Chemie, volume 265 [1951], pages 274 et seq.). It is also known that a mixture of a methyl-chlorosilane with bromine does not form hydrogen bromide, either in the presence of free radical producers or under the influence of light. The fact that, nevertheless, a bromination of Si-linked methyl radicals is achieved by the process claimed, and this so completely that no chloromethyl-silicon compound can be detected in the product, is all the more surprising, since it is known that the chlorination of hydrocarbons with sulphuryl chloride may be accelerated by the addition of bromine (cf. Journal of the Chemical Society, London, volume 127 [1925], page 1729).

The process described is also otherwise largely free from interfering side reactions; higher brominated silicon compounds are formed in the process to a negligible extent only, and since chlorination products are absent and, therefore, the distillative isolation of the bromine derivatives proceeds rapidly and simply, the black residues which are otherwise formed from the complicated mixtures of higher halogenated compounds which accelerate the decomposition of the desired products, are also absent. On the other hand, the risk of flame phenomena or explosions is obviated so that the expenditure of controlling and protective devices required for the photochemical method using chlorine and bromine is unnecessary in the process of the present invention.

The methyl-(bromomethyl)-chlorosilanes prepared according to the invention may be used, as is known, as intermediates in the production of carbofunctional silanes, siloxanes and silazanes.

The following examples are given for the purpose of illustrating the invention.

Example 1

A mixture of 108.6 g. (1 mol) trimethyl-chlorosilane, 79.9 g. (0.5 mol) bromine, 67.5 g. (0.5 mol) sulphuryl chloride and 1 g. azo-iso-butyrodinitrile is heated at the boil under reflux until the temperature of the boiling mixture has risen from an initial 57.5° C. to 81° C. The reaction mixture then contains (determinable by gas chromatography) 60.1 percent by weight dimethyl-(bromomethyl)-chlorosilane and 5.2 percent by weight of higher brominated compounds; the rest consists of unreacted reaction components. The yield of dimethyl-(bromomethyl)-chlorosilane amounts to 92%, based on the amount of trimethyl-chlorosilane consumed.

Example 2

A mixture of 129 g. (1 mol) dimethyl-dichloro-silane, 79.9 g. (0.5 mol) bromine, 67.5 g. (0.5 mol) sulphuryl chloride and 1 g. azo-iso-butyrodinitrile is heated at the boil under reflux until the temperature of the boiling mixture has risen from an initial 61° C. to 80° C. The reaction mixture then contains (determinable by gas chromatography) 43.2 percent by weight methyl-(bromomethyl)-dichlorosilane and 4.5 percent by weight of higher brominated compounds; the rest consists of unreacted reaction components.

Example 3

Into a reaction vessel which is connected to a distillation device via an overflow pipe to form a circulation apparatus, and the contents of which are continuously heated to a temperature between 56 and 58° C., there is continuously fed a flow of 1 litre per hour of a mixture having the composition indicated in Example 1. The bulk of the unreacted components is distilled off at 90° C. from the overflowing reaction mixture and these components are recycled into the reaction vessel. The discharged residue consists (according to gas chromatographic determination) of 69.1 percent by weight dimethyl-(bromomethyl)-chlorosilane, 20.8 percent by weight trimethyl chlorosilane, 6.8 percent by weight of higher boiling products and 3.3. percent by weight of lower boiling components ($SO_2Cl_2$ and bromine). The yield of dimethyl-(bromomethyl)-chlorosilane amounts to 87.3%, based on the amount of trimethylchlorosilane consumed.

What we claim is:

1. A process for the preparation of a methyl-(bromomethyl)-chlorosilane of the formula

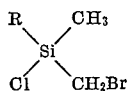

wherein R represents a methyl radical or a chlorine atom, which comprises reacting a methyl-chlorosilane of the formula $RSi(CH_3)_2Cl$ with sulphuryl chloride and bromine at a temperature between 20 and 80° C.

2. A process as claimed in claim 1 wherein the reaction is effected in the presence of a catalytic amount of an organic free radical initiator.

3. A process as claimed in claim 2, wherein the free radical initiator is azo-iso-butyrodinitrile.

4. A process as claimed in claim 3 wherein 1 gram of azo-iso-butyrodinitrile is used per mol of the methyl chlorosilane of the formula $RSi(CH_3)_2Cl$.

5. A process as claimed in claim 1 wherein the reaction is carried out in a circulation device whereby the unreacted components of the reaction mixture are continuously separated and continuously recycled into the process.

References Cited

UNITED STATES PATENTS

| | | | |
|---|---|---|---|
| 3,215,666 | 11/1965 | Simmler | 260—448.2 X |
| 3,297,735 | 1/1967 | Simmler. | |
| 3,324,161 | 6/1967 | Simmler. | |
| 3,345,393 | 10/1967 | Simmler et al. | |

TOBIAS E. LEVOW, *Primary Examiner.*

P. F. SHAVER, *Assistant Examiner.*